United States Patent
Crosley

(10) Patent No.: US 9,112,827 B2
(45) Date of Patent: Aug. 18, 2015

(54) DETERMINING APPROPRIATE BROWSING APPLICATIONS FOR SELECTED NETWORK RESOURCES

(71) Applicant: Amazon Technologies, Inc., Reno, NV (US)

(72) Inventor: Jay Austin Crosley, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 347 days.

(21) Appl. No.: 13/836,540

(22) Filed: Mar. 15, 2013

(65) Prior Publication Data

US 2014/0280482 A1    Sep. 18, 2014

(51) Int. Cl.
*G06F 15/173* (2006.01)
*H04L 29/08* (2006.01)
*H04L 12/24* (2006.01)
*G06F 17/30* (2006.01)

(52) U.S. Cl.
CPC .......... *H04L 67/02* (2013.01); *G06F 17/30861* (2013.01); *H04L 12/2408* (2013.01); *H04L 67/22* (2013.01); *H04L 41/0253* (2013.01)

(58) Field of Classification Search
CPC .............. G06F 17/30861; H04L 12/2408; H04L 41/0253
USPC ........... 709/203, 217, 220, 223, 228; 715/738
See application file for complete search history.

(56) References Cited

U.S. PATENT DOCUMENTS

| | | | |
|---|---|---|---|
| 5,978,817 A * | 11/1999 | Giannandrea et al. | 715/207 |
| 7,996,778 B2 | 8/2011 | Dandekar et al. | |
| 8,108,457 B2 * | 1/2012 | Ramadas | 709/202 |
| 8,407,337 B2 * | 3/2013 | Debettencourt et al. | 709/224 |
| 8,984,128 B2 * | 3/2015 | Tuovinen et al. | 709/224 |
| 2005/0246444 A1 | 11/2005 | Koehane et al. | |
| 2010/0191799 A1 * | 7/2010 | Fiedorowicz et al. | 709/203 |
| 2010/0218106 A1 * | 8/2010 | Chen et al. | 715/738 |
| 2010/0251217 A1 | 9/2010 | Miller et al. | |
| 2012/0137201 A1 | 5/2012 | White et al. | |
| 2013/0007642 A1 | 1/2013 | Abuelsaad et al. | |
| 2014/0280482 A1 * | 9/2014 | Crosley | 709/203 |

OTHER PUBLICATIONS

"International Search Report and Written Opinion for Application PCT/US2014/024167, mailed Jul. 24, 2014."

* cited by examiner

*Primary Examiner* — Michael Y Won
(74) *Attorney, Agent, or Firm* — Athorus, PLLC

(57) ABSTRACT

A network resource, such as a page, may be loaded or rendered in different manners on a plurality of different browsers. Data and information regarding the loading and/or rendering of various network resources on a variety of browsers, including data or information regarding errors, latencies or customer ratings of the loading or rendering of such resources on such browsers, may be evaluated in order to identify the most appropriate browser for viewing a requested network resource. If that network resource is available to a user who requests the network resource, then a recommendation or an instruction to view the network resource in the most appropriate browser may be provided to the user.

26 Claims, 8 Drawing Sheets

| | BROWSER 1 | | | BROWSER 2 | | | BROWSER 3 | | |
|---|---|---|---|---|---|---|---|---|---|
| TOP-LEVEL DOMAIN | ERROR% | LATENCY (ms) | RATINGS | ERROR% | LATENCY (ms) | RATINGS | ERROR% | LATENCY (ms) | RATINGS |
| MARKET-SITE.CC | 14.68% | 109.4 | ★1/2 | 1.10% | 3.2 | ★★★★★ | 7.90% | 58.6 | ★★ |
| WEATHER-SITE.CC | 2.22% | 1.1 | ★★★★ | 10.20% | 92.0 | ★★1/2 | 58.69% | 113.4 | ★1/2 |
| SPORTS-SITE.CC | 8.71% | 38.9 | ★★★1/2 | 100.00% | - | | 1.99% | 2.3 | ★★★★1/2 |

| TOP-LEVEL DOMAIN | BROWSER | DATE AND TIME | ERROR | LATENCY (ms) | USER COMMENTS |
|---|---|---|---|---|---|
| | | | 802 | 804 | OPERATIONAL INFORMATION 806 |
| WEATHER-SITE.CC | BROWSER 1 | 20120308 0626 ET | N | 0.8 | "SMOOTH, SLICK!" |
| WEATHER-SITE.CC | BROWSER 1 | 20120308 1205 ET | N | 1.3 | |
| WEATHER-SITE.CC | BROWSER 2 | 20120309 1430 ET | N | 88.8 | "SLOW" |
| WEATHER-SITE.CC | BROWSER 2 | 20120310 1355 ET | N | 95.9 | "CAN'T STREAM MAP PROJECTIONS." |
| WEATHER-SITE.CC | BROWSER 3 | 20120311 2035 ET | Y | 129.9 | "TERRIBLE. AVOID AT ALL COSTS." |
| SPORTS-SITE.CC | BROWSER 1 | 20120326 1418 ET | N | 9.6 | "NOT BAD." |
| SPORTS-SITE.CC | BROWSER 2 | 20120327 1305 ET | Y | | "LOCKED UP EVERYTHING, HAD TO REBOOT." |
| SPORTS-SITE.CC | BROWSER 3 | 20120328 1118 ET | N | 2.9 | "BETTER THAN TV." |
| SPORTS-SITE.CC | BROWSER 3 | 20120329 2117 ET | N | 4 | "TOP QUALITY AUDIO STREAMING." |
| SPORTS-SITE.CC | BROWSER 3 | 20120330 0115 ET | N | 1.9 | "THE BEST, HANDS DOWN." |

*FIG. 8*

DETERMINING APPROPRIATE BROWSING APPLICATIONS FOR SELECTED NETWORK RESOURCES

BACKGROUND

A browser is a client-side application that retrieves, processes and renders Internet or other network-based content to a user of a computer device in response to a request for such content. Most browsers operate by receiving code from one or more servers and/or server-side applications according to a certain protocol, such as Hypertext Transfer Protocol (or "HTTP"). The browsers then assemble one or more objects based on or derived from the code into a page, such as a web page, that is displayed to a user on a user interface. Browsers usually include one or more engines for translating information received from servers into renderable content, interpreters for parsing and executing scripts, and caches or other data stores for storing information in the form of "cookies," or files that relate to a user's browsing activity, which may be retrieved by one or more sites in the future.

The display of a page on a browser begins when a user requests one or more files associated with a Uniform Resource Identifier ("URI"), such as a Uniform Resource Locator (or "URL"), or other file location. The request by the user may take the form of an entry of a URI or URL into an address box or address bar; a selection of an image or set of text that may be hyperlinked to a URI or URL; or a selection of a bookmark, a home button or any other feature that may be linked to or otherwise associated with a URI or URL. Upon receiving the request, a server associated with the URI or URL handles the request by providing code expressed in one or more computer languages, such as Hypertext Markup Language (or "HTML"). The browser then uses one or more rendering engines (or layout engines) to display the code provided by the server into the page, which may include one or more files embedded within the code provided by the server.

Users of any kind of computer device may select from a number of standard browsers to view electronic content, and many computer devices include more than one browser to choose from. Some of the most popular browsers available today include Internet Explorer® by Microsoft Corporation, Chrome® by Google, Inc., Firefox® by Mozilla Corporation and Safari® by Apple, Inc. Although each browser is typically adapted to retrieve, process and render any type of electronic content, no two browsers operate in exactly the same way. For example, many different types of browsers use different types of rendering engines to display content. Also, different types of browsers may be programmed to respond to errors, irregularities or non-standard sections of programmed code in different ways. Browsers may also respond differently to scripted functions applications (e.g., those programmed in JavaScript® language) or interpret a style sheet or other formatting guide associated with a page, in a different fashion. Therefore, the same page may occasionally appear differently on different browsers.

BRIEF DESCRIPTION OF THE DRAWINGS

FIG. 8 is a table of an illustrative set of data considered used in determining an appropriate browsing application for selected network resources, in accordance with embodiments of the present disclosure.

DETAILED DESCRIPTION

Figure 1:
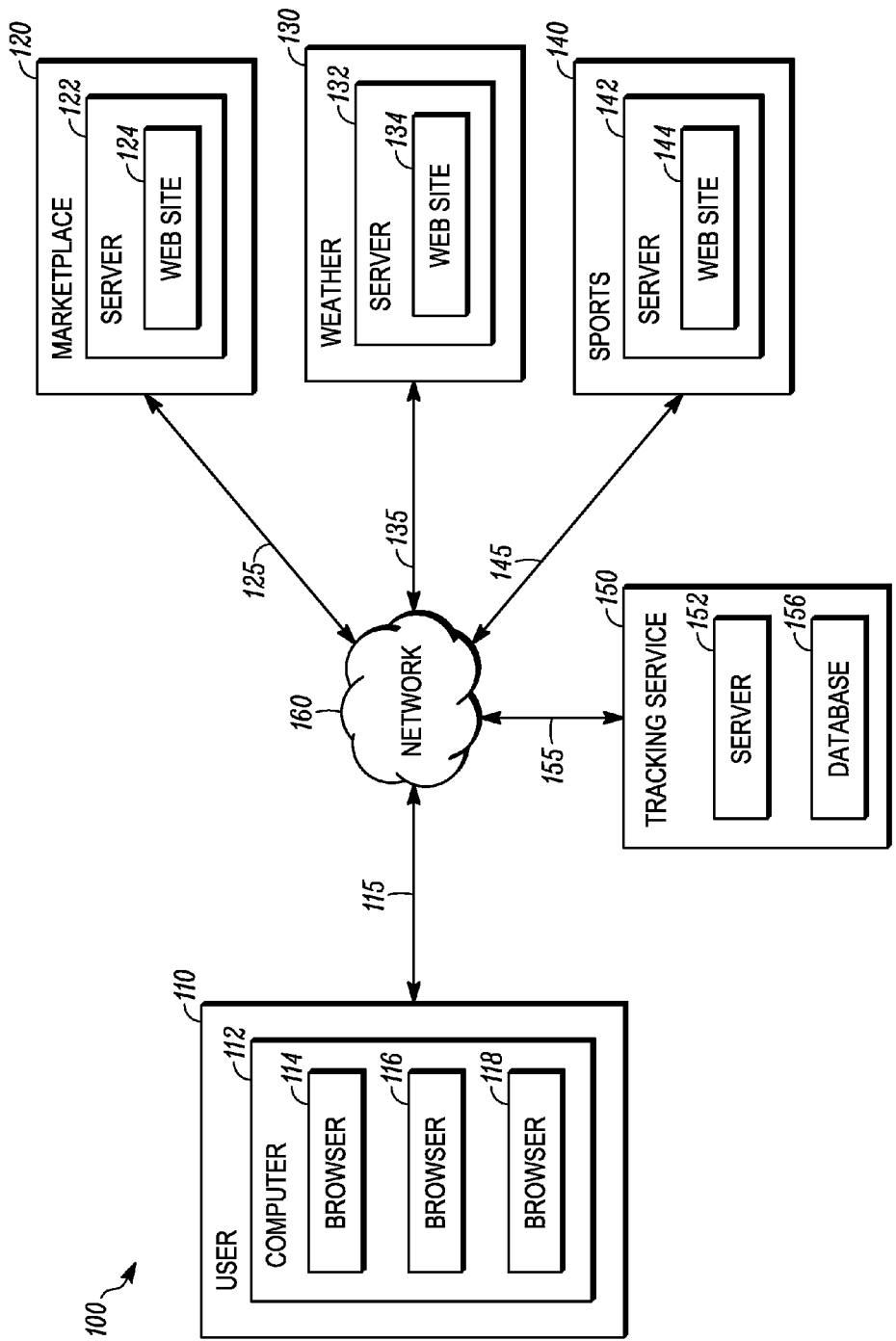
FIG. 1 is a block diagram of an illustrative system for determining an appropriate browsing application for selected network resources, in accordance with embodiments of the present disclosure.

As is set forth in greater detail below, the present disclosure is directed to systems and methods for tracking success in loading one or more pages on a variety of different browsers, and recommending an appropriate browser to a user who requests to review a specific page. Specifically, according to some embodiments of the present disclosure, one or more tracking services may monitor the performance of multiple browsers in retrieving, processing and satisfactorily rendering pages to users of such browsers. Where a user requests to view a specific page using a certain browser, a tracking application operating on the user's computer may contact one or more such tracking services to determine whether the user's browser is appropriate for viewing the page, or whether another browser is more appropriate for viewing the page, and should be utilized instead.

Browsers are designed to receive requests for one or more Internet or other network-based resources, such as a web site or web service, from a user, to transmit requests for code corresponding to the requested resources to one or more server-side applications, to receive such code from the server-side applications, and to present the requested resources to the user on a browser display. Browsers may display a variety of electronic content, including HTML files and also documents, images, audio or video files, or any other type of information. Browsers generally attempt to receive, interpret and present HTML files on user interfaces according to one or more specifications, such as those established by the World Wide Web Consortium.

Browsers typically feature several primary components, including a user interface, a rendering engine (or layout engine), an interpreter and one or more data stores or caches. The user interface typically feature some or all common operational features, including address bars for inserting a universal resource identifier or locator ("URI" or "URL") associated with a network resource, buttons for navigating to and from previously viewed network resources, and features for storing identifiers or locators for network resources in the form of "bookmarks." Additionally, modern browsers typically have the capacity to display multiple resources on multiple user interfaces, which may be accessed or toggled through the selection of one or more tabs or other like features.

The rendering engine renders the requested resource and its associated contexts on the user interface. Most rendering engines parse HTML code received from a server-side application into a Document Object Model (or "DOM") tree, determining any styles and building frames of a layout for displaying the content, before adding attributes to the layout, or "painting" the layout. The rendering engine usually receives files programmed in HTML, but may also receive documents in other formats. The interpreter interprets and executes any functions or scripts programmed in other languages, such as JavaScript®. The data stores or caches may be used to hold any type of data relating to the rendering of network resources on the user interfaces, including images, media files or indicia of user preferences or browsing activity.

Different types of browsers usually include different variants of the main components described above and may operate according to one or more different methods or standards. For example, many different browsers feature different rendering engines, including the Gecko® rendering engine, which is utilized in the Firefox® browser; the Trident® rendering engine, which is utilized in the Internet Explorer®; and the WebKit™ rendering engine, which is used in the Safari® and Chrome® browsers. Therefore, while a page (or different pages that are programmed in a similar manner, or originate from a common top-level domain) typically appears in the same manner each time that the page is loaded by a single browser, the same page may appear differently to a user who views the page on different browsers (e.g., an image on the page may load more quickly, one or more frames on the page may be arranged differently, or a body of text may be formatted differently, on one browser than another).

The systems and methods of the present disclosure are directed to obtaining and tracking data regarding the presentation of network resources on multiple browsers, and analyzing such data to provide recommendations or instructions for rendering a selected network resource on a specific browser. Some data that may be considered by the systems and methods disclosed herein include the rates at which errors are encountered in loading a network resource on a browser, or the latency associated with the loading of the network resource (e.g., delays of any period of time) on the browser, as well as any satisfaction measures or ratings of a user's experience in viewing the network resource on a particular browser. Any other data reflecting the appropriateness of a particular browser for a selected page may be utilized according to the systems and methods of the present disclosure. Moreover, the data may be sorted or refined based on attributes of not only a type of browser (e.g., Internet Explorer®, Chrome®, Firefox®, Safari®), but also a version of the browser (e.g., Internet Explorer® 9, Chrome® 17, Firefox® 3.6, Safari® 2.0) or a combination of the browser and an operating system or computer device (e.g., Internet Explorer® 10 operating on Windows® 8, Chrome® 23 operating on Mac® OS X 10.8.2).

The systems and methods of the present disclosure may comprise a tracking application or other software program operating on a computer machine having multiple browsers residing thereon. When a user of the computer machine requests a network resource using one or more browsers, or programs affiliated with such browsers (e.g., a word processing application adapted to request a network resource upon a selection of a hyperlink to the network resource in a document opened therein), the tracking application transmits a URI or URL associated with the network resource to a tracking service, which may then search for browsing data for the URI or URL among a lookup table or other data file within a data store. The data store may include information such as a number of parsing errors, JavaScript® interpretation errors, "refreshes" or "reloads," delays or latencies, or any other relevant information regarding browser performance, sorted by URI or URL. The tracking service may then report to the tracking application the name of a browser, or the names of browsers, that may display the requested network resource in the most appropriate manner, and the tracking application may cause the requested network resource to be displayed in one or more of the most appropriate browsers.

According to yet another embodiment of the present disclosure, a user of a local computing device may transmit a request for a network resource from a browsing subsystem to a remote computing device, which may operate one or more browsing subsystems. The remote computing device may then request the network resource on each of the operating browsing subsystems, and select the one of the subsystems that presents the network resource in the most appropriate format, which may be determined according to one or more qualitative or quantitative measures. The electronic content rendered on the selected browsing subsystem on the remote machine may then be transferred to the browsing subsystem operating on the local machine, and the user may then view the network resource in the most compatible format.

A recommendation or identification of a most compatible browser for a requested network resource may be presented to a user on any basis and in any manner. For example, a user's computing device may operate one or more applications for automatically switching between available browsers based on the respective browsers' compatibility with a selected network resource. Next, where a user requests a network resource from a browser that is not the most compatible browser for the display of that network resource, a pop-up or other visible window may be displayed above or adjacent to the content that was displayed on the browser at the time of the user's request. The pop-up window may display data regarding the compatibility of any of the browsers available on the user's computer, and one or more selectable features (e.g., radio buttons) for selecting one of the available browsers. Additionally, reports or results on the compatibility of a network resource with a particular browser may be displayed alongside the displayed results of a search through a search engine, e.g., alongside icons or other features indicative of the most compatible browser for viewing each of the results.

Moreover, in situations in which two or more browsers are deemed to be equally appropriate for viewing a selected network resource, or equally compatible with the network resource, the systems and methods of the present disclosure may choose a browser for viewing the selected network resource at random, according to one or more preferences set by a user, or on any other basis. For example, if a browser from which a network resource is requested is not the most optimal browser available to the user for viewing the network resource, but if the most optimal browser would only provide a marginal increase in compatibility or quality over the browser from which the network resource was selected (e.g., if a metric of the compatibility or quality of the most optimal browser does not exceed a metric of the compatibility or quality of the browser from which the network resource was selected by a certain threshold), then the systems and methods of the present disclosure may decline to switch browsers, to avoid any inherent delays or inconveniences that may be associated with such a switch. Additionally, if a user expresses a preference for a particular type of browser, e.g., if the user has assembled a developed set of cookies or bookmarks residing on or associated with the preferred type of browser, then another browser may be selected or recommended only if that browser provides a significant operational advantage over the user's preferred type of browser.

The compatibility of browsers with network resources may be evaluated with any level of granularity or detail, ranging from the compatibility of a top-level domain hosting multiple network resources to the compatibility of each and every individual network resource hosted at the top-level domain. For example, because pages that originate from a common top-level domain are sometimes rendered in the same manner, a preferred browser for a requested network resource may be presumed to be the same browser from which the network resource was requested, if the network resource presented on the browser at the time that the requested network resource was requested originates from the same top-level domain as the presented network resource. Alternatively, the threshold for recommending a preferred browser for a requested network resource that differs from the browser from which the network resource was requested may be elevated if the requested network resource originates from the same top-level domain as the presented network resource. For example, a different browser may be recommended only if the requested network resource is unable to load on the browser from which the network resource was requested, e.g., the browser would experience a fatal error.

Furthermore, a recommendation of a preferred browser may be based on the computing device from which a network resource was requested. Because browsers retrieve, process and render network resources in different manners depending on the computing devices on which such browsers are operating, a recommendation of a preferred browser for a requested network resource may be determined based on a combination of factors regarding the browsers and the computing devices from which a network resource is requested. Additionally, according to another embodiment of the present disclosure, cookies or bookmarks associated with the browsers operating on a computing device may be stored in a central location and made accessible to each of the browsers that is available to the user, thereby facilitating the transition from one browser to another.

Referring to FIG. 1, components of one system 100 for determining an appropriate browsing application for selected network resources are shown. The system 100 includes a user 110, a marketplace 120, a weather source 130, a sports source 140 and a tracking service 150 that are connected to one another across a network 160, such as the Internet. The user 110 may be any entity or individual that uses a computer 112 to access the network 160 for any purpose, such as to download, purchase, rent, lease, borrow or otherwise obtain items (which may include goods, products, services or information of any type or form) from an electronic marketplace 120, or to obtain electronic news or other information from one or more remote sources, such as the weather source 130 or the sports source 140. The user 110 may utilize one or more computing devices, such as the computer 112, or any other like machine that may operate or access one or more software applications, such as the browsers 114, 116, 118. The computer 112 or the other like machines utilized by the user 110 may be connected to or otherwise communicate with the marketplace 120, the weather source 130 or the sports source 140 through the network 160, as indicated by line 115, by the transmission and receipt of digital data.

The marketplace 120 may be any entity or individual that wishes to make items available for download, purchase, rent, lease or borrowing by customers through the use of at least one network resource such as web site or page 124 maintained using a networked computer infrastructure, including one or more physical computer servers 122. The web site 124 may be implemented using the server 122, which may be connected to or otherwise communicate with the network 160, as indicated by line 125, by the sending and receiving of digital data. The merchant 120 may also cause one or more items to be delivered to customers, such as the user 110. In addition, items that are made available by the merchant 120 or ordered therefrom by customers may be made by or obtained from one or more third party sources, such as sellers, vendors or manufacturers (not shown), or from any other source. Moreover, the merchant 120 itself may be a seller, a vendor or a manufacturer.

The weather source 130 and the sports source 140 may be any entity or organization that provides information to computer users, such as the user 110, who access web sites 134, 144 maintained by the weather source 130 or the sports source 140 over the network 160. The web sites 134, 144 may be implemented using the servers 132, 142, which may be connected to or otherwise communicate with the network 160, as indicated by lines 135, 145, by the sending and receiving of digital data. Furthermore, the weather source 130 and the sports source 140 and the components thereof or applications operating thereon may provide access, transfer mail, host pages, peer with other computer infrastructures, or perform any other network-related function, and may take any real or virtual form.

The tracking service 150 may be any entity or individual that tracks information regarding the performance of multiple browsers in loading one or more network resources, or the compatibility of such network resources with multiple browsers, and transmits recommendations or instructions to one or more computers, or to applications operating thereon, as to the compatibility of a selected network resource with one or more browsers on such computers. As is shown in FIG. 1, the tracking service 150 may maintain a networked computer infrastructure, including one or more physical computer servers 152 and/or databases 156, for executing one or more applicable functions or storing any form of applicable data. For example, the server 152 may receive, and the database 156 may store, information regarding selections of network resources by users of browsers for later analysis. Additionally, the server 152 may act according to one or more formulas or algorithms for analyzing such data and providing recommendations to users based thereon, and may be connected to or otherwise communicate with the network 160, as indicated by line 155, by the sending and receiving of digital data.

The user 110, the marketplace 120, the weather source 130, the sports source 140 and the tracking service 150 may operate one or more order processing and/or communication systems which may be implemented through one or more computing machines that may be connected to the network 160, in order to transmit information in the form of digital or analog data corresponding to any type of network resource, such as the marketplace web site 124, the weather web site 134, the sports web site 144, or for any other purpose. For example, the user 110 may communicate with the marketplace web site 124, the weather web site 134, the sports web site 144 or any third party by electronic mail (or E-mail), or other messaging techniques, including short or multimedia messaging service (SMS or MMS) text messages or any other form of electronic message, or through one or more interfaces provided by one of the browsers 114, 116, 118, which may operate on a computer 112 that is connected to the network 160, as is indicated by line 115. Similarly, the marketplace 120, the weather source 130, the sports source 140 or the tracking service 150 may communicate with the user 110 or any third party by electronic mail via one or more interfaces provided through the servers 122, 132, 142, 152 or by the web sites 124, 134, 144, as is indicated by lines 125, 135, 145, 155. Moreover, messaging between numerous E-mail clients or agents maintained by the user 110, the marketplace 120, the weather source 130, the sports source 140 or the tracking service 150 may be provided.

Those of skill in the pertinent art will recognize that the user 110, the marketplace 120, the weather source 130, the sports source 140 or the tracking service 150 may operate a keyboard, keypad, mouse, stylus, touch screen, or other device (not shown) or method to interact with the computers, servers, devices and the like, or to "select" an item, link, node, hub or any other aspect of the present disclosure, such as to interact with the computer 112 and/or the browsers 114, 116, 118; the servers 122, 132, 142 and/or the web sites 124, 134, 144; or the server 152 and/or the database 156.

Those of skill in the pertinent art will also recognize that the computers, servers, devices and the like described herein have the necessary electronics, software, memory, storage, databases, firmware, logic/state machines, microprocessors, communication links, displays or other visual or audio user interfaces, printing devices, and any other input/output interfaces to perform the functions described herein and/or achieve the results described herein. The computer 112 and the servers 122, 132, 142, 152 may include any of a number of computing devices that are capable of communicating over the network, including but not limited to set-top boxes, personal digital assistants, mobile phones including "smartphones," digital media players, web pads, tablet computers, laptop computers, desktop computers, electronic book readers, and the like. The protocols and components for providing communication between the computer 112 and the servers 122, 132, 142, 152 are well known to those skilled in the art of computer communications and thus, need not be described in more detail herein. Additionally, those of ordinary skill in the art would recognize that the systems and methods of the present disclosure are not limited to the components shown in FIG. 1, and may further include any other form of browser or network resource.

Some embodiments of the systems and methods of the present disclosure may also be provided in the form of data and/or computer executable instructions, programs, firmware, software and the like (also referred to herein as "computer executable" components) described herein stored on a computer executable program product including a non-transitory machine-readable storage medium having stored thereon instructions (in compressed or uncompressed form) that may be used to program a computer (or other electronic device) to perform processes or methods described herein. The computer executable program product may be accessed by one or more machines associated with the computer 112 and/or the servers 122, 132, 142, including but not limited to hard drives, floppy diskettes, optical disks, CD-ROMs, DVDs, read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium that may be suitable for storing electronic instructions.

Figure 2:
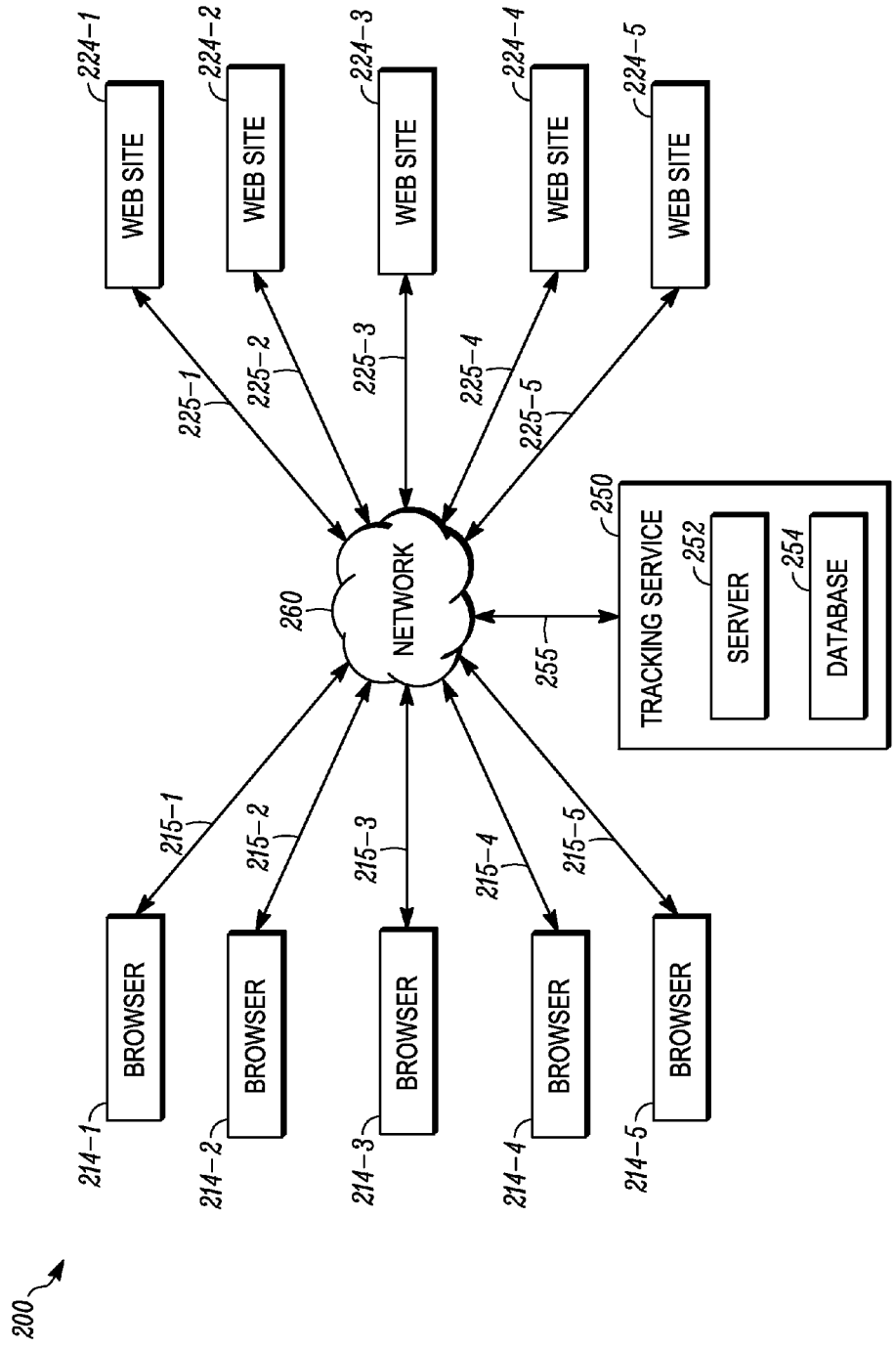
FIG. 2 is a block diagram of an illustrative system for determining an appropriate browsing application for selected network resources, in accordance with embodiments of the present disclosure.

For the purposes of illustration, some of the systems and methods disclosed herein may be referenced primarily in the context of a user who accesses one or more network resources using a computer having access to multiple browsers, such as the user 110, the browsers 114, 116, 118 and the web sites 124, 134, 144 shown in FIG. 1. As will be recognized by those of ordinary skill in the art, however, the systems and methods disclosed herein may also be used in many other situations in which the compatibility of any type or form of web site or network resource with any type or form of browser operating on any type or form of computer may be determined, and their utility is not limited to any of the preferred embodiments described herein. Referring to FIG. 2, a system 200 for determining an appropriate browsing application for selected network resources is shown. Except where otherwise noted, elements having reference numerals beginning with "2" in FIG. 2 are similar to elements having reference numerals beginning with "1" in FIG. 1.

The system 200 shown in FIG. 2 includes a plurality of browsers 214-1, 214-2, 214-3, 214-4, 214-5, a plurality of web sites 224-1, 224-2, 224-3, 224-4, 224-5 and a tracking service 250. Each of the browsers 214-1, 214-2, 214-3, 214-4, 214-5 may be maintained on one or more computers or computer-related machines (not shown), and is connected to or otherwise adapted to communicate over the network 260, as is indicated by lines 215-1, 215-2, 215-3, 215-4, 215-5. Each of the web sites 224-1, 224-2, 224-3, 224-4, 224-5 may be maintained by one or more servers or other computer-related components (not shown) and is also connected to or otherwise adapted to communicate over the network 260, as is indicated by lines 225-1, 225-2, 225-3, 225-4, 225-5. The tracking service 250 may maintain a networked computer infrastructure, including one or more physical computer servers 252 and/or databases 256, for executing one or more applicable functions or storing any form of applicable data, and is also connected to or otherwise adapted to communicate over the network 260, as is indicated by line 255. Specifically, the tracking service 250 may be adapted to track information regarding the performance of the browsers 214-1, 214-2, 214-3, 214-4, 214-5 in loading one or more network resources, such as the web sites 224-1, 224-2, 224-3, 224-4, 224-5, or the compatibility of such network resources with multiple browsers. The tracking service is further adapted to transmit recommendations of a particular browser or instructions to one or more computers, or to applications operating thereon, as to the compatibility of a selected network resource with one or more browsers on such computers.

For example, where a user of a browser, such as any of the browsers 214-1, 214-2, 214-3, 214-4, 214-5, requests to view one or more network resources, such as any of the web sites 224-1, 224-2, 224-3, 224-4, 224-5, the tracking system 250 may receive or intercept such requests and capture or record data regarding the compatibility of the browsers with the network resources, or the performance of the browsers in retrieving, processing and rendering content maintained at the network resources. Such data may refer to errors encountered by the respective browsers, including instances where one or more documents associated with the network resource is unavailable; where access to such documents from the browser is denied or forbidden; where the browser is unable to connect to a server; where a connection is reset by a peer or refused by a host; or where a domain name system lookup has failed. Such data may further refer to delay times or other latencies associated with the loading of respective network resources on specific browsers, customer ratings of the performance of specific browsers in displaying content associated with network resources, or any other qualitative or quantitative indicator of compatibility of a network resource with a browser. Based on such data, the tracking service 250 may make one or more determinations as to the compatibility of a network resource with one or more browsers, and provide recommendations or instructions for displaying the network resource in such browsers, either independently or in concert with one or more applications operating on a local computer.

Figure 3:
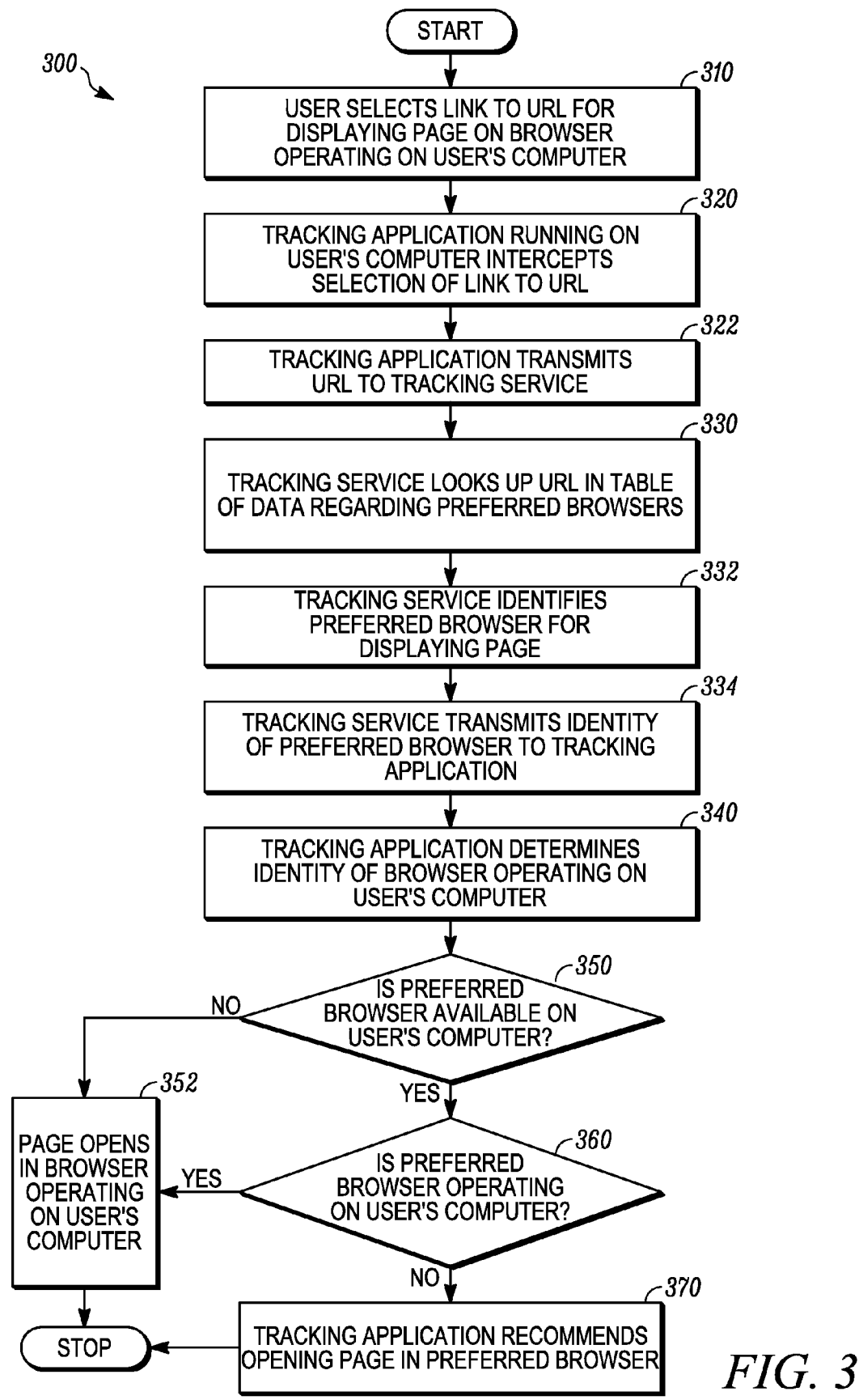
FIG. 3 is a flow chart of an illustrative process for determining an appropriate browsing application for selected network resources, in accordance with embodiments of the present disclosure.

Referring to FIG. 3, a flow chart 300 representing one embodiment of a process for determining user information from automated replies is shown. At block 310, a user selects a link to a uniform resource identifier or locator ("URI" or "URL") for displaying a page on a browser operating on the user's computer. For example, the user may select a linked image or set of text associated with the page. Alternatively, the user may select a bookmark or designated button or feature (e.g., a "home" icon) associated with the page.

At block 320, a tracking application running on the user's computer intercepts the user's selection of the link to the URL, and at block 322, the tracking application transmits the URL to a tracking service, such as the tracking service 150, 250 shown in FIGS. 1 and 2. For example, where a user selects a link to a specific network resource (e.g., a home page maintained at www.webpage.info or a file located at www-.documents.files.cc/file.pdf), the tracking application may transmit either the complete location for the network resource, or a domain name (e.g., webpage.info or files.cc) associated with the network resource.

At block 330, after receiving the URL from the tracking application, the tracking service searches for the URL in a lookup table or other data file regarding preferred browsers for displaying the page associated with the URL. The tracking service may maintain or access one or more files containing errors, latency data or customer ratings regarding the loading of network resources on browsers, and may search for any information regarding the specific page associated with the URL that was selected by the user at block 310. At block 332, the tracking service identifies a preferred browser for displaying the page, and at block 334, the tracking service transmits the identity of the preferred browser to the tracking application. For example, where the tracking service receives a URL or other information regarding a requested network resource from a tracking application, the tracking service may identify the most appropriate browser for viewing the network resource and transmit the name or some other identifier of the most appropriate browser back to the tracking application.

At block 350, the tracking application determines whether the preferred browser is available on the user's computer. If the preferred browser is not available on the user's computer, then the process advances to block 352, where the requested page is loaded on the browser from which it was selected, and the process ends. If the preferred browser is available on the user's computer, then the process advances to block 360, where it is determined whether the preferred browser is operating on the user's computer. If the preferred browser is operating on the user's computer, then the process advances to block 352, and ends. If the preferred browser is not operating on the user's computer, then the process advances to block 370, where the tracking application recommends opening the requested browser, and the process ends.

Accordingly, one or more services or applications operating according to the systems and methods of the present disclosure may receive a selection of a network resource from a user, determine the most appropriate or compatible browser for viewing the network resource and whether such browser is available to the user based on any available data, and make a recommendation to the user that he or she open the network resource in that browser. As is discussed above, the recommendation may take or appear in any form, including one or more windows that appear on or above a browser or other application operating on a computer display, one or more recommendations that appear adjacent to a set of search results, or any other form.

Figures 4A, 4B:
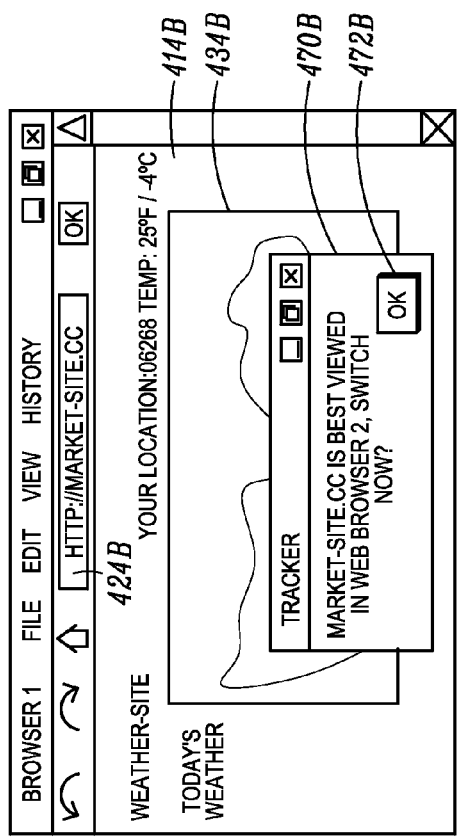
FIG. 4A is a table of an illustrative set of data used in determining an appropriate browsing application for selected network resources, in accordance with embodiments of the present disclosure.
FIG. 4B is a pictorial diagram of an illustrative user interface used in determining an appropriate browsing application for selected network resources, in accordance with embodiments of the present disclosure.

Referring to FIG. 4A, a set 400 of data that may be considered by the systems and methods of the present disclosure when identifying one or more appropriate network resources for viewing a selected page is shown. As is shown in FIG. 4A, the data in the set 400 is displayed in a table including columns corresponding to top-level domains 404A of network resources and respective browsers 414A, 416A, 418A. The set 400 of data includes error data (referenced in percents), latency data (referenced in milliseconds) and customer ratings (referenced according to a five-star system) for the loading of network resources within or beneath the top-level domains 424A, 434A, 444A.

The set 400 of data may be utilized by systems and methods of the present disclosure to determine which browser is most appropriate for a network resource. For example, for the top-level domain 424A (viz., market-site.cc), the browser 416A (viz., Browser 2) has the lowest error rates, the lowest latency and the highest rating of any of the browsers 414A, 416A, 418A. For the top level domain 434A (viz., weather-site.cc), the browser 414A (viz., Browser 1) has the lowest error rates, the lowest latency and the highest rating of any of the browsers 414A, 416A, 418A. For the top-level domain 444A (viz., sports-site.cc), the browser 418A (viz., Browser 3) has the lowest error rates, the lowest latency and the highest rating of any of the browsers 414A, 416A, 418A.

Accordingly, based on the set 400 of data in FIG. 4A, the systems and methods of the present disclosure may be adapted to instruct or recommend that a user who attempts to access the top-level domain 424A using browser 414A or browser 418A instead elect to access the top-level domain 424A using browser 416A. The systems and methods disclosed herein may further instruct or recommend that a user who attempts to access the top-level domain 434A using browser 416A or browser 418A instead elect to access the top-level domain 434A using browser 414A. The systems and methods disclosed herein may further instruct or recommend that a user who attempts to access the top-level domain 444A using browser 414A or browser 416A instead elect to access the top-level domain 444A using browser 418A.

An instruction or recommendation to view a requested network resource in a different browser may appear in any manner or format, such as in a pop-up window that appears above a user interface on a computer display. Referring to FIG. 4B, a computer display 412B including a browser 414B showing a page 434B is shown. The browser 414B and page 434B correspond to the data regarding the browser 414A and top-level domain 434A, respectively, shown in FIG. 4A. Where a user attempts to access a different page, such as by providing the browser 414B with a new address 424B, the systems and methods of the present disclosure may display a window 470B that informs the user that the requested page located at the address 424B is best viewed in a different browser, and that includes a button 472B for switching from the browser 414B to the different browser in order to review the requested page.

As is discussed above, where a user who is viewing a page on a browser then requests to view a different page, the systems and methods of the present disclosure may determine, by one or more qualitative or quantitative means, whether the browser from which the different page was requested is the most appropriate and compatible browser for viewing the page. For example, although pages that originate from code that is programmed in a similar manner, such as pages originating from a common top-level domain, typically appear in a similar manner on a common browser, pages that are programmed in a different manner or originate from different top-level domains may appear differently on different browsers. Such means may also identify an appropriate and compatible browser for viewing the page based on a combination of factors regarding the respective browsers and also the computing devices on which such browsers are operating.

Therefore, the systems and methods disclosed herein may determine whether a browser is the most appropriate for viewing a page, and if not, may recommend a different browser for viewing the page if the different browser would provide an improved experience for the user in terms of compatibility or quality, e.g., a level of compatibility or quality that exceeds the level of compatibility or quality available on the browser from which the page was requested. For example, a preferred browser for a requested network resource may be presumed to be the same browser from which the network resource was requested, if a network resource presented on the browser at the time that the requested network resource was requested originates from the same top-level domain as the presented network resource. Alternatively, a threshold for recommending a preferred browser for a requested network resource that differs from the browser from which the network resource was requested may be elevated if the requested network resource originates from the same top-level domain as the presented network resource, or a different browser may be recommended only if the browser would experience a fatal error upon attempting to render the requested network resource.

Figure 5:
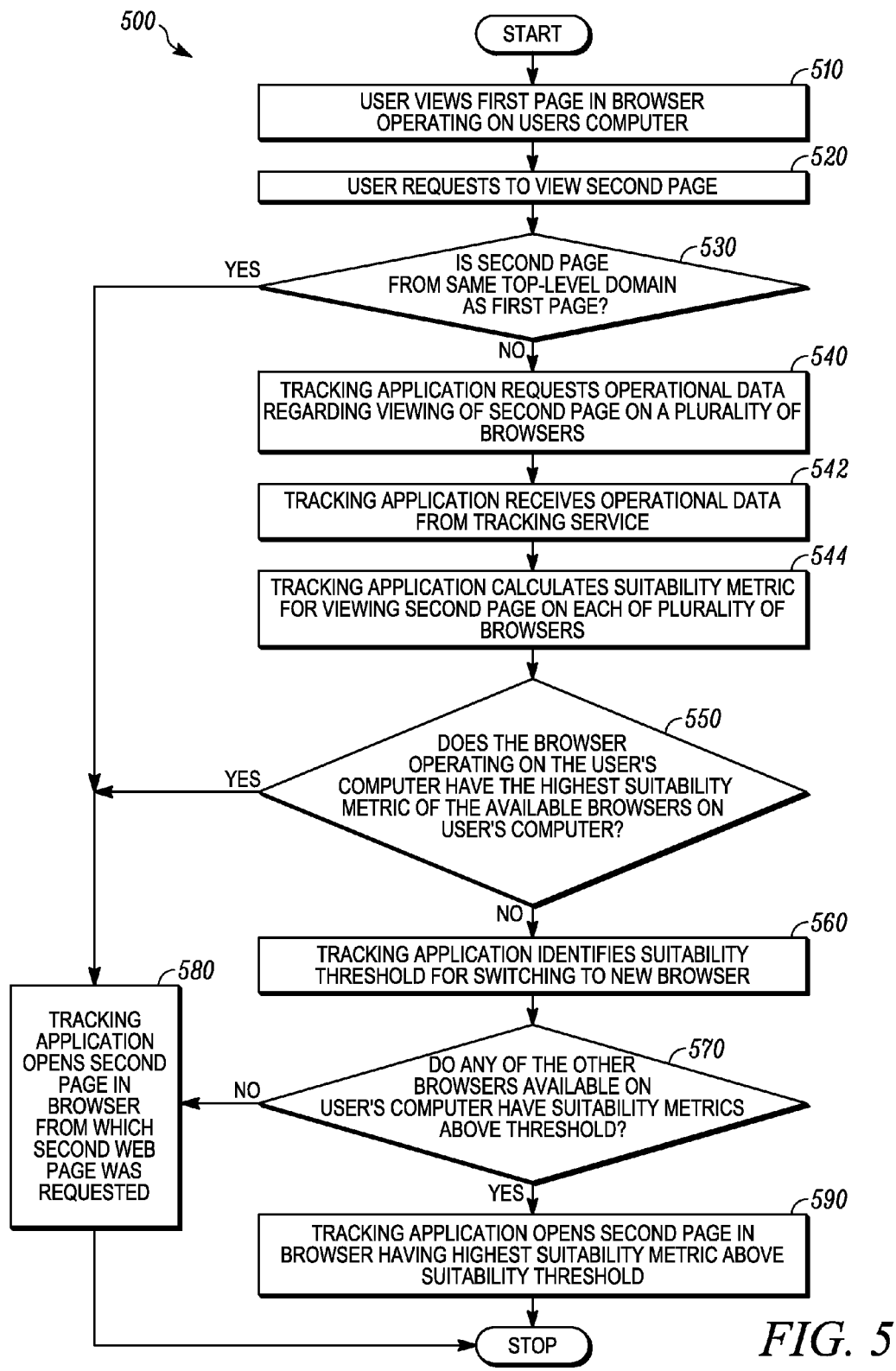
FIG. 5 is a flow chart of an illustrative process for determining an appropriate browsing application for selected network resources, in accordance with embodiments of the present disclosure.

Referring to FIG. 5, a flow chart 500 representing one embodiment of a process that may be performed by a system for determining user information from automated replies is shown. At block 510, a user views a first page in a browser operating on the user's computer, and at block 520, the user requests to view a second page. For example, the user may select a hyperlinked image or set of text, a bookmark, a home button or other feature associated with another page.

At block 530, the system determines whether the second page is hosted at the same top-level domain as the first page. For example, the system may compare the URL or an Internet Protocol ("IP") address of the requested second page to the URL or IP address of the displayed first page, to determine whether the second page is hosted at the same top-level domain as the first page. As is discussed above, pages that are programmed in a similar manner, such as those that originate from a common top-level domain, typically appear within a browser with a similar or common level of compatibility or quality. If the second page is from the same top-level domain as the first page, then the process advances to block 580, where the tracking application causes the second page to be opened in the same browser from which it was requested.

If the second page is not from the same top-level domain as the first page, then the process advances to block 540, where the tracking application requests operational data regarding the viewing of the second page on a plurality of browsers. For example, the tracking application may request a set of data, such as the set 400 of data shown in FIG. 4A, corresponding to the viewing of the second page on multiple browsers. At block 542, the tracking application receives the requested operational data from a tracking service, and at block 544, the tracking application calculates a suitability metric for viewing the second page on each of the plurality of browsers for which operational data is available, such as according to one or more weighted formulas or algorithms.

At block 550, the system determines whether the browser from which the second page was selected has the highest suitability metric of the available browsers on the user's computer. If the browser has the highest suitability rating of any of the available browsers, then the process advances to block 580, where the tracking application causes the second page to be opened in the same browser from which it was requested. If the browser from which the second page was requested does not have the highest suitability score, then the process advances to block 560, where a suitability threshold for switching to a new browser is identified. As is discussed above, the systems and methods disclosed herein may decline to recommend that a user view a requested page on a different browser, even if that browser has a higher suitability score for viewing the requested page, if the different browser would provide only an insignificant or insubstantial increase in compatibility or quality.

At block 570, the system determines whether any of the other browsers that may be available on the user's computer has a suitability metric above the suitability threshold. If none of the other browsers has a suitability metric above the suitability threshold, then the system advances to block 580, where the tracking application causes the second page to be opened in the same browser from which it was requested. If any of the other available browsers has a suitability metric above the suitability threshold, then the process advances to block 590, where the second page is displayed in the browser having the highest suitability metric above the suitability threshold, and the process ends.

Accordingly, the systems and methods of the present disclosure may be utilized to determine whether a browser from which a user requests a network resource is the most compatible and appropriate browser for viewing that resource. If the browser from which the user selected the network resource is the most compatible and appropriate option, or if no other available browser is more compatible or appropriate, then the systems and methods disclosed herein may open the network resource in that browser. If, however, another browser available to the user is more compatible or more appropriate for viewing the network resource, then the systems or methods disclosed herein may recommend that the user switch to another browser to view the network resource, or may cause the browser to open and display the network resource therein. Moreover, where no data is available regarding the viewing of a network resource on one or more browsers, or where two or more browsers are substantially equally compatible or appropriate for viewing a network resource, then the systems and methods of the present disclosure may select one network resource at random, or according to one or more preferences established by the user. Alternatively, where the network resource was requested from one of the substantially equally compatible or appropriate browsers, then the systems and methods of the present disclosure may recommend no change at all.

As is discussed above, the systems and methods disclosed herein may further be utilized by systems in which the actions of retrieving, processing and rendering a requested network resource may be split across multiple computing devices, such as a remote computing device that accesses the network resource using multiple remote browsers or browsing subsystems, which may be operated on one or more remote servers associated with the remote computing device, and a local computing device (e.g., a user's computer) operating a local browser or browsing subsystem. According to one embodiment of the present disclosure, content associated with a requested network resource may be rendered by one or more of the remote browsing systems, and the remote browsing subsystem that displays the network resource in the most compatible or appropriate manner may be selected, such that the content rendered by the selected remote browsing system may be transferred to the local browsing system for presentation to the user.

Figure 6:
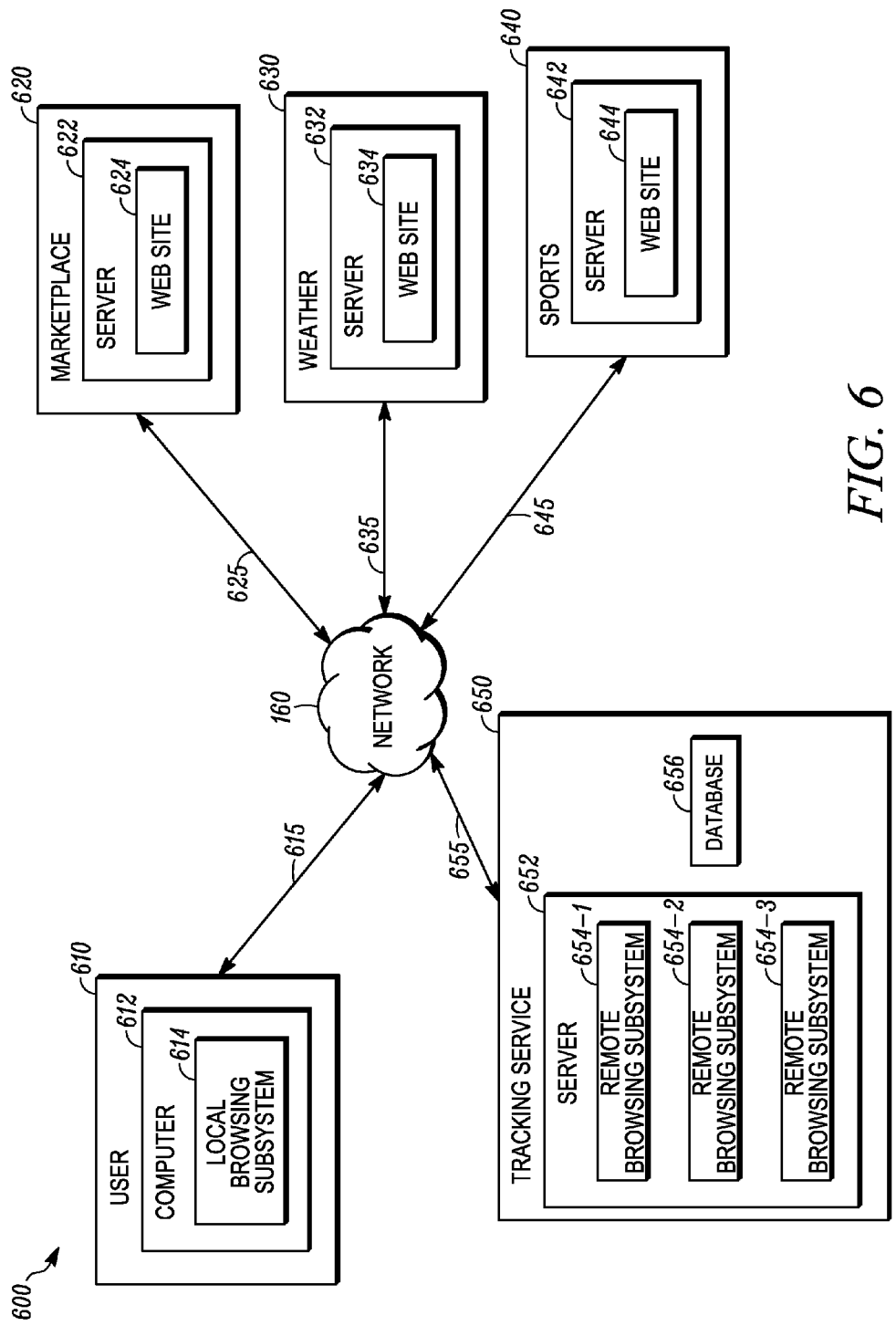
FIG. 6 is a block diagram of an illustrative system for determining an appropriate browsing application for selected network resources, in accordance with embodiments of the present disclosure.

Referring to FIG. 6, a system 600 for determining an appropriate browsing application for selected network resources is shown. Except where otherwise noted, elements having reference numerals beginning with "6" in FIG. 6 are similar to elements having reference numerals beginning with "2" in FIG. 2, or elements having reference numerals beginning with "1" in FIG. 1.

As is shown in FIG. 6, the system 600 includes a local browsing subsystem 614 operating on a computer 612, and a tracking service 650 having a server 652 operating remote browsing subsystems 654-1, 654-2, 654-3. The system 600 of FIG. 6 may permit a user 610 to select a network resource (such as the marketplace web site 624, the weather web site 634 or the sports web site 644) to be viewed on the computer 612 using the local browsing subsystem 614, which may then transmit an identifier of the selected network resource (e.g., a URI or URL) to the server 652 for processing. The server 652 may be adapted to cause some or all of the selected network resource to be loaded or rendered on each of the available remote browsing subsystems 654-1, 654-2, 654-3, each of which may operate one or more browsers. If the selected network resource loads more effectively or compatibly on one of the available remote browsing subsystems 654-1, 654-2, 654-3, then the content associated with the selected network resource may then be transferred to the local browsing subsystem 614, where it may be viewed by the user 610.

Figure 7:
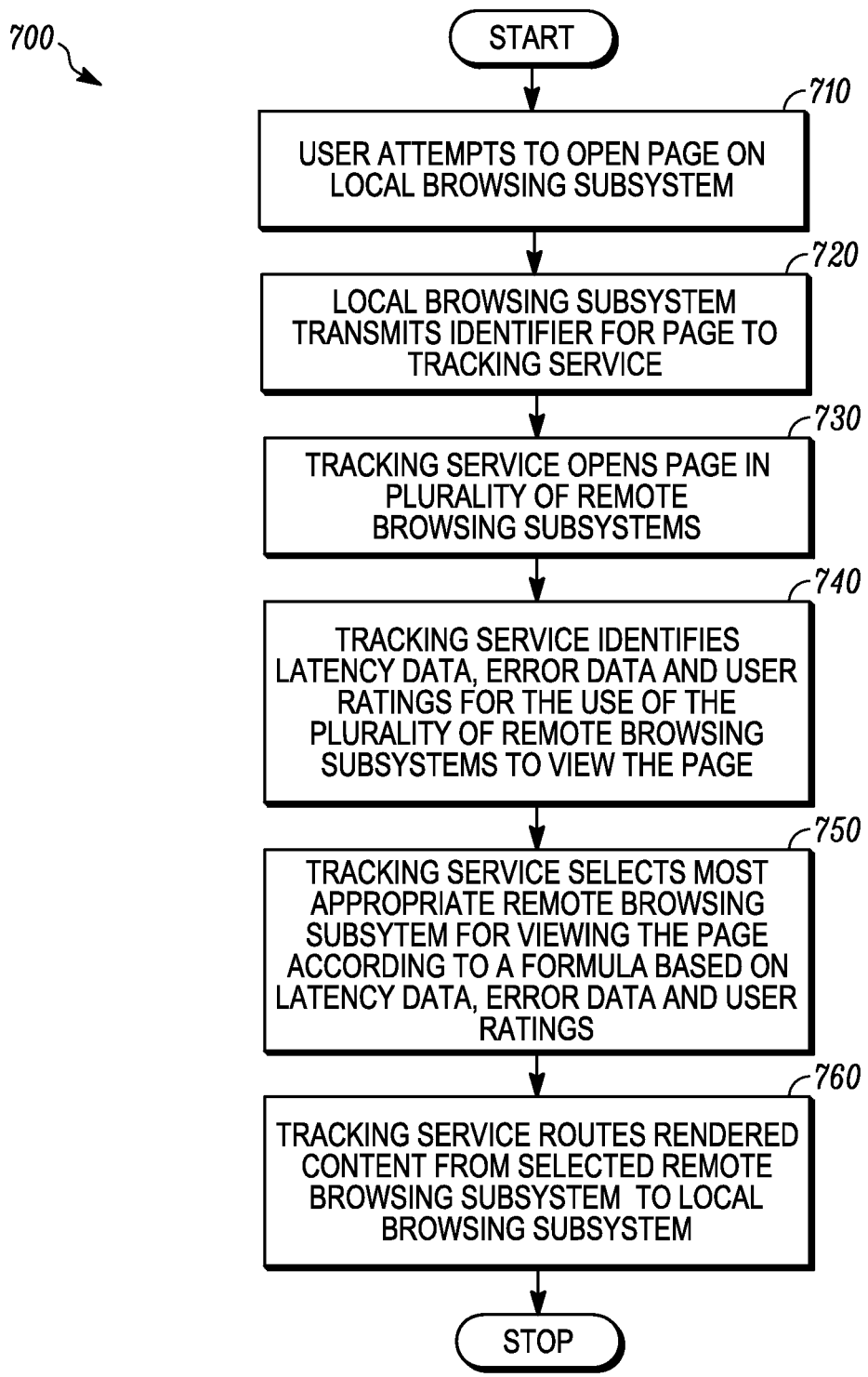
FIG. 7 is a flow chart of an illustrative process for determining an appropriate browsing application for selected network resources, in accordance with embodiments of the present disclosure.

Referring to FIG. 7, a flow chart 700 representing one embodiment of a process that may be performed by a system for determining user information from automated replies is shown. At block 710, a user attempts to open a page on a local browsing subsystem, such as the subsystem 614 operating on computer 612 shown in FIG. 6. At block 720, the local browsing subsystem transmits an identifier of the page, such as a URI or a URL, to a tracking service, such as the tracking service 650 shown in FIG. 6.

At block 730, the tracking service opens the page in a plurality of remote browsing subsystems, and at block 740, identifies a set of latency data, error data and user ratings for the use of the plurality of remote browsing subsystems to view the page. For example, the tracking service may identify a set of data, such as the set 400 of data shown in FIG. 4A, which includes historical data regarding the display of the page on multiple browsing systems, such as error rates, latency times or performance ratings provided by users.

At block 750, the tracking service selects the most appropriate remote browsing subsystem for viewing the page according to formulas that take into account the error data, latency data or performance ratings associated with the viewing of the page on other browsing systems. For example, referring again to FIG. 4A, the tracking service would select browser 414A to view a page hosted at top-level domain 434A; browser 416A to view a page hosted at top level domain 424A; and browser 418A to view a page hosted at top-level domain 444A, based on the low error rates and latency times, and high customer ratings provided thereby. At block 760, the tracking service routes the rendered content from the selected remote browsing subsystem to the local browsing subsystem, and the process ends.

Accordingly, where some or all of the functions associated with retrieving, processing and rendering a network resource requested from a local computing device, such as the computer 610 of FIG. 6, is performed on one or more remote computing devices, such as the tracking service 650 and/or server 652 of FIG. 6, such external computing devices may load the network resources on browsers maintained on the remote computing devices and provide content to the local computing device as rendered by the most appropriate or compatible browser for viewing the requested network resource.

The data on which a determination of compatibility or suitability is based according to the systems and methods of the present disclosure may be obtained in real time or in near-real time, or calculated in one or more offline processes. Such data may further be aggregated within one or more data stores instantly, at predefined intervals or in accordance with a regular schedule, and may be averaged to provide general recommendations of one or more compatible or appropriate browsers for viewing a network resource, or based on one or more specific instances of browsing activity (e.g., where even a single viewing of a page on a browser fails, the systems and methods disclosed herein may provide recommendations to view the page on alternate browsers). Moreover, such data may include quantitative, measurable variables (e.g., rates of errors or delay times), as well as qualitative indicators, such as text-based comments provided by one or more users. Referring to FIG. 8, a set 800 of data regarding browsing activity is shown. Except where otherwise noted, elements having reference numerals beginning with "8" in FIG. 8 are similar to elements having reference numerals beginning with "4" and/or ending in "A" in FIG. 4A.

As is shown in FIG. 8, the data in the set 800 refers to the loading of network resources from top-level domains 830, 840 on browsers 814, 816, 818. Specifically, the set 800 includes operational data regarding the loading of network resources at particular dates and times, including the incidences of errors 802, latency times 804 and any user comments 806, which are expressed in words or phrases. The user comments 806 may be mined or otherwise harvested to identify keywords corresponding to satisfaction or dissatisfaction with the loading of a network resource on a particular browser 814, 816, 818, such as "smooth," "top quality" or "best" versus "slow," "terrible" or "reboot." Where user comments 806 imply that one or more browsers is compatible or appropriate, or incompatible or inappropriate, for the loading of a network resource, such information may be utilized to further identify the best possible browser for a network resource, in addition to quantitative metrics such as the incidences of errors 802 or the latency times 804, or any other factor.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, those of ordinary skill in the art would recognize that the systems and methods of the present disclosure may be adapted for use with any browser that may presently exist, or that may exist in the future, and are not limited to one or more of the standard browsers (e.g., Internet Explorer®, Chrome®, Firefox®, Safari®) referenced herein. Moreover, those of ordinary skill in the art would also recognize that the systems and methods disclosed herein may be used to evaluate the compatibility of any type of network resource with any type of browser, and are not limited to evaluating the compatibility of marketplaces, weather sites or sports sites.

Additionally, although many of the embodiments described above relate to the selection of compatible or appropriate browsers operating on local or client computers, the systems and methods of the present disclosure are not so limited. For example, is discussed above, the systems and methods disclosed herein may be utilized to identify one or more compatible or appropriate browsing applications operating on remote machines, such as the browsing subsystems shown in FIG. 6, which may be physically located in any proximity to a local or client computer.

It should be understood that, unless otherwise explicitly or implicitly indicated herein, any of the features, characteristics, alternatives or modifications described regarding a particular embodiment herein may also be applied, used, or incorporated with any other embodiment described herein. Moreover, with respect to the one or more methods or processes of the present disclosure described herein, including but not limited to the flow charts shown in FIGS. 3, 5 and 7, the order in which the blocks of the methods or processes are listed is not intended to be construed as a limitation on the claimed inventions, and any number of the method or process blocks can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to present that an item, term, etc. may be either X, Y, or Z, or a combination thereof. Thus, such conjunctive language is not generally intended to imply that certain embodiments require at least one of X, at least one of Y and at least one of Z to each is present.

Although the invention has been described and illustrated with respect to exemplary embodiments thereof, the foregoing and various other additions and omissions may be made therein and thereto without departing from the spirit and scope of the present disclosure.

What is claimed is:

1. A non-transitory computer readable medium having computer-executable instructions stored thereon,
   wherein the instructions, when executed, cause a computer having at least one computer processor to perform a method comprising:
   identifying information regarding a request for a first network resource from a first browser operating on the computer;
   identifying browser performance data regarding the first network resource in a data store;
   calculating, for each of a plurality of browsers, a suitability score based at least in part on the browser performance data regarding the first network resource, wherein the suitability score is indicative of the suitability of each of the plurality of browsers for the presentation of the first network resource on the computer;
   identifying a preferred browser available on the computer for the first network resource based at least in part on the suitability scores for at least some of the plurality of browsers;
   determining whether the first browser is the preferred browser available on the computer;
   in response to determining that the first browser is the preferred browser available on the computer,
      causing the first network resource to be displayed in the first browser; and
   in response to determining that the first browser is not the preferred browser available on the computer;
      causing the first network resource to be displayed in the preferred browser available on the computer.

2. The computer readable medium of claim 1, wherein the browser performance data is associated with displaying a plurality of network resources on the plurality of browsers, and
   wherein the browser performance data comprises at least one of error statistics, latency statistics or customer ratings.

3. The computer readable medium of claim 1, wherein identifying the preferred browser available on the computer for the first network resource based at least in part on the browser performance data regarding the first network resource comprises identifying the plurality of browsers available on the computer.

4. The computer readable medium of claim 1, wherein the method further comprises:
   identifying a second network resource displayed on the first browser at a time of the request;
   identifying a top-level domain of the first network resource; and
   identifying a top-level domain of the second network resource,
   wherein identifying the preferred browser available on the computer further comprises:
      if the top-level domain of the second network resource is the top-level domain of the first network resource, designating the first browser as the preferred browser available on the computer.

5. A computer-implemented method for displaying network resources comprising:
   receiving, from a computing device over a network, information regarding a network resource requested by the computing device;
   identifying, using a computer processor, operational data regarding presentation of a plurality of network resources on a plurality of browsers;
   calculating, using the computer processor, a suitability score for each of the plurality of browsers based at least in part on the at least some of the operational data, wherein the suitability score is indicative of the suitability of the browser for the presentation of the requested network resource;
   identifying, using the computer processor, at least one of the plurality of browsers having a sufficiently high suitability score;
   selecting, using the computer processor, at least one of the plurality of browsers having the sufficiently high suitability score as a preferred browser for presenting the requested network resource; and
   transmitting, to the computing device over the network, information regarding the preferred browser for presenting the requested network resource.

6. The computer-implemented method of claim 5, wherein the requested network resource is requested by a first browser operating on the computing device.

7. The computer-implemented method of claim 6, wherein the first browser is not the preferred browser.

8. The computer-implemented method of claim 5, further comprising:
determining, using the computer processor, whether the preferred browser is available on the computing device.

9. The computer-implemented method of claim 8, wherein the information regarding the preferred browser comprises a recommendation to open the requested network resource in the preferred browser, and
wherein the method further comprises causing a display of a window comprising the recommendation on a computer display of the computing device.

10. The computer-implemented method of claim 8, wherein the information regarding the preferred browser comprises an instruction to open the requested network resource in the preferred browser, and
wherein the method further comprises causing a display of the requested network resource in the preferred browser on a computer display of the computing device based at least in part on the instruction.

11. The computer-implemented method of claim 5, wherein the information regarding the preferred browser for presenting the requested network resource to the computing device is transmitted to a tracking application operating on the computing device.

12. The computer-implemented method of claim 5, wherein the operational data is associated with the presentation of the plurality of network resources on the plurality of browsers, and
wherein the operational data comprises at least one of error data, latency data and customer ratings.

13. The computer-implemented method of claim 5, wherein selecting the at least one of the plurality of browsers having the sufficiently high suitability score as the preferred browser for presenting the requested network resource further comprises:
designating, using the computer processor, one of the at least one of the plurality of browsers having the sufficiently high suitability score as the preferred browser.

14. The computer-implemented method of claim 5, further comprising:
identifying a suitability threshold;
comparing, using the computer processor, the sufficiently high suitability score to the suitability score of a first browser from which the network resource was requested;
if the sufficiently high suitability score satisfies the suitability threshold, designating one of the at least one of the plurality of browsers having the sufficiently high suitability score as the preferred browser.

15. The computer-implemented method of claim 14, wherein identifying the suitability score threshold further comprises:
identifying, using the computer processor, a network resource presented on the first browser at a time of the request;
identifying, using the computer processor, a top-level domain associated with the presented network resource;
identifying, using the computer processor, a top-level domain associated with the requested network resource;
if the top-level domain associated with the presented network resource is the top-level domain associated with the requested network resource,
assigning, using the computer processor, a first value to the suitability threshold; and
if the top-level domain associated with the presented network resource is not the top-level domain associated with the requested network resource,
assigning, using the computer processor, a second value to the suitability threshold,
wherein the first value exceeds the second value.

16. The computer-implemented method of claim 6, wherein selecting the at least one of the plurality of browsers having the sufficiently high suitability score as the preferred browser for presenting the requested network resource further comprises:
identifying, using the computer processor, a presented network resource on the first browser at a time of the request;
identifying, using the computer processor, a top-level domain associated with the presented network resource;
identifying, using the computer processor, a top-level domain associated with the requested network resource; and
if the top-level domain associated with the presented network resource is the top-level domain associated with the requested network resource,
designating, using the computer processor, the first browser as the preferred browser.

17. The computer-implemented method of claim 6, wherein selecting the at least one of the plurality of browsers having the sufficiently high suitability score as the preferred browser for presenting the requested network resource further comprises:
identifying, using the computer processor, a presented network resource on the first browser at a time of the request;
identifying, using the computer processor, a top-level domain associated with the presented network resource;
identifying, using the computer processor, a top-level domain associated with the requested network resource;
if the top-level domain associated with the presented network resource is the top-level domain associated with the requested network resource,
determining, using the computer processor, whether the requested network resource comprises any content of the presented network resource;
in response to determining that the requested network resource comprises at least some of the content of the presented network resource, designating, using the computer processor, the first browser as the preferred browser.

18. The computer-implemented method of claim 5, wherein selecting the preferred browser for presenting the requested network resource further comprises:
identifying, using the computer processor, a presented network resource on a first browser from which the requested network resource was requested;
identifying, using the computer processor, a top-level domain associated with the presented network resource;
identifying, using the computer processor, a top-level domain associated with the requested network resource;
if the top-level domain associated with the presented network resource is the top-level domain associated with the requested network resource,
determining, using the computer processor, whether the requested network resource may be rendered on the first browser;
in response to determining that the requested network resource may be rendered on the first browser, designating, using the computer processor, the first browser as the preferred browser;
in response to determining that the requested network resource may not be rendered on the first browser, designating, using the computer processor, the one of the plurality of browsers having the highest suitability score as the preferred browser; and
if the top-level domain associated with the presented network resource is not the top-level domain associated with the requested network resource, designating, using the computer processor, the one of the plurality of browsers having the highest suitability score as the preferred browser.

19. The computer-implemented method of claim 5, further comprising:
receiving a search term from a user of the computing device over the network; and
identifying a plurality of search results associated with the search term using the computer processor, wherein each of the search results is associated with a network resource,
wherein transmitting information regarding the preferred browser for presenting the requested network resource to the computing device over the network comprises:
causing a display of a plurality of search results on a computer display of the computing device, wherein each of the search results comprises a link to the network resource associated with the search result; and
causing a display of identifiers of preferred browsers for each of the plurality of search results on the computer display of the computing device,
wherein one of the search results comprises the link to the requested network resource, and
wherein one of the identifiers refers to the preferred browser for displaying the requested network resource.

20. The computer-implemented method of claim 5, further comprising:
receiving a search term from a user of the computing device over the network; and
identifying a set of search results associated with the search term using the computer processor, wherein each of the search results is associated with a network resource;
modifying the set of search results to preferentially favor network resources for which the preferred browser is preferred for presentation,
wherein transmitting information regarding the preferred browser for presenting the requested network resource to the computing device over the network comprises:
causing a display of at least a portion of the modified set of search results on a computer display of the computing device.

21. The computer-implemented method of claim 20, wherein modifying the set of search results comprises at least one of:
reordering, using the computer processor, the set of search results to preferentially favor network resources for which the preferred browser is preferred for presentation, and
removing, using the computer processor, search results for which the preferred browser is not preferred for presentation from the set.

22. The computer-implemented method of claim 5, wherein the preferred browser is selected based at least in part on the presentation of the requested network resource on the preferred browser operating on the computing device.

23. A computer system comprising,
a data store configured to store electronic content; and
a computing device in communication with the data store, the computing device configured to at least:
receive a request to view a network resource from a local browsing subsystem;
retrieve electronic content regarding the requested network resource from the data store;
cause rendering of the electronic content associated with the requested network resource on a plurality of remote browsing subsystems;
identify performance data regarding the rendering of the electronic content associated with the requested network resource on a plurality of remote browsing subsystems;
calculate a suitability metric for each of the plurality of remote browsing subsystems based at least in part on at least some of the performance data;
select at least one of the plurality of remote browsing subsystems having a sufficiently high suitability metric; and
transmit the electronic content associated with the requested network resource rendered on the selected at least one of the plurality of remote browsing subsystems having the sufficiently high suitability metric to the local browsing subsystem.

24. The computer system of claim 23, wherein the computer system is further configured to:
cause a display of at least some of the transmitted electronic content associated with the requested network resource rendered on the selected at least one of the plurality of remote browsing subsystems having the sufficiently high suitability metric on the local browsing subsystem.

25. The computer system of claim 23, wherein the performance data is associated with the rendering of a plurality of network resources on the plurality of remote browsing subsystems, and
wherein the performance data comprises at least one of error statistics, latency statistics or customer ratings.

26. The computer system of claim 23, wherein the computer system is further configured to select the at least one of the plurality of remote browsing subsystems by:
calculating a suitability metric for each of the plurality of remote browsing subsystems based on the at least some of the performance data,
wherein the selected at least one of the remote browsing subsystems is the at least one of the plurality of remote browsing subsystems having a sufficiently high suitability metric.

* * * * *